United States Patent
Gregory et al.

(10) Patent No.: US 10,982,657 B2
(45) Date of Patent: Apr. 20, 2021

(54) TEMPERATURE CONTROL BASED ON WEATHER FORECASTING

(71) Applicant: VESTAS WIND SYSTEMS A/S, Aarhus N (DK)

(72) Inventors: Karl Gregory, Cowes (GB); Joe Cuoghi, Ryde (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 120 days.

(21) Appl. No.: 16/473,008

(22) PCT Filed: Dec. 21, 2017

(86) PCT No.: PCT/DK2017/050448
§ 371 (c)(1),
(2) Date: Jun. 24, 2019

(87) PCT Pub. No.: WO2018/113889
PCT Pub. Date: Jun. 28, 2018

(65) Prior Publication Data
US 2019/0323485 A1    Oct. 24, 2019

(30) Foreign Application Priority Data
Dec. 22, 2016 (DK) .................. PA 2016 71038

(51) Int. Cl.
*F03D 80/40* (2016.01)
*F03D 7/02* (2006.01)

(52) U.S. Cl.
CPC .............. *F03D 80/40* (2016.05); *F03D 7/024* (2013.01); *F03D 7/028* (2013.01); *F05B 2260/8211* (2013.01); *F05B 2270/1033* (2013.01)

(58) Field of Classification Search
CPC .......... F03D 80/40; F03D 7/024; F03D 7/028; F05B 2260/8211; F05B 2270/1033
(Continued)

(56) References Cited

U.S. PATENT DOCUMENTS 2,295,340 A * 9/1942 Fiene ................. G05D 23/2754
236/68 B
7,086,834 B2 * 8/2006 LeMieux .................. F03D 7/02
416/1

(Continued)

FOREIGN PATENT DOCUMENTS

| CN | 1795332 A | 6/2006 |
|---|---|---|
| CN | 103080538 A | 5/2013 |

(Continued)

OTHER PUBLICATIONS

PCT Written Opinion of the International Searching Authority for Application No. PCT/DK2017/050448 dated Mar. 28, 2018.
(Continued)

*Primary Examiner* — Pedro J Cuevas
(74) *Attorney, Agent, or Firm* — Patterson + Sheridan, LLP

(57) ABSTRACT

Temperature Control Based on Weather Forecasting Examples are generally directed to techniques for controlling a temperature of a blade, such as a blade in a wind turbine system. One example of the present disclosure is a method of controlling a temperature of a blade. The method includes inputting current weather conditions and future weather conditions into a processor, generating a first power production curve, generating a second power production curve based on future weather conditions, comparing the first power production curve to the second power production curve, determining which power production curve minimizes a new power production loss of the blade, and adjusting a heating cycle of the blade based on the power (Continued)

production curve that minimizes the net power productions loss of the blade.

15 Claims, 11 Drawing Sheets

(58) Field of Classification Search
USPC .................................................. 290/44, 55
See application file for complete search history.

(56) References Cited

U.S. PATENT DOCUMENTS

| | | | | |
|---|---|---|---|---|
| 8,413,930 | B2* | 4/2013 | Gregory | B64D 15/04 |
| | | | | 244/134 B |
| 9,133,828 | B2* | 9/2015 | Egedal | F03D 80/40 |
| 9,567,869 | B2* | 2/2017 | Lauritsen | F01D 25/00 |
| 9,828,972 | B2* | 11/2017 | Cuoghi | F03D 17/00 |
| 10,458,275 | B2* | 10/2019 | Chilukuri | B64D 15/02 |
| 10,865,778 | B2* | 12/2020 | Muller | F03D 80/40 |
| 2003/0225751 | A1* | 12/2003 | Kim | G06F 16/3344 |
| 2005/0276696 | A1* | 12/2005 | LeMieux | F03D 7/02 |
| | | | | 416/61 |
| 2008/0141768 | A1* | 6/2008 | Ormel | F03D 80/40 |
| | | | | 73/170.07 |
| 2008/0149771 | A1* | 6/2008 | Zanarelli | F02C 7/047 |
| | | | | 244/134 R |
| 2008/0206052 | A1* | 8/2008 | Volkmer | G01H 1/006 |
| | | | | 416/61 |
| 2010/0163678 | A1* | 7/2010 | Gregory | B64D 15/04 |
| | | | | 244/134 B |
| 2010/0189560 | A1* | 7/2010 | Haraguchi | F03D 7/0224 |
| | | | | 416/1 |
| 2011/0089692 | A1 | 4/2011 | Girardin | |
| 2012/0207589 | A1* | 8/2012 | Fridthjof | F03D 17/00 |
| | | | | 415/121.3 |
| 2012/0226485 | A1 | 9/2012 | Creagh et al. | |
| 2013/0031966 | A1* | 2/2013 | Egedal | F03D 80/40 |
| | | | | 73/112.01 |
| 2013/0195657 | A1* | 8/2013 | Lauritsen | F01D 25/00 |
| | | | | 416/1 |
| 2013/0257055 | A1* | 10/2013 | Simpson | F03D 3/00 |
| | | | | 290/52 |
| 2015/0292486 | A1 | 10/2015 | Zhou et al. | |
| 2016/0040654 | A1* | 2/2016 | Cuoghi | F03D 80/40 |
| | | | | 416/1 |
| 2019/0113025 | A1* | 4/2019 | Badger | H05B 3/34 |
| 2020/0028367 | A1* | 1/2020 | Brombach | H02J 3/381 |
| 2020/0240391 | A1* | 7/2020 | Lubker | B32B 27/32 |

FOREIGN PATENT DOCUMENTS

| | | |
|---|---|---|
| CN | 104047813 A | 9/2014 |
| CN | 104066983 A | 9/2014 |
| CN | 105089929 A | 11/2015 |
| EP | 2672111 2 A2 | 12/2013 |
| EP | 2778404 A1 | 9/2014 |
| WO | 2018113889 A1 | 6/2018 |

OTHER PUBLICATIONS

PCT International Search Report for Application No. PCT/DK2017/050448 dated Mar. 28, 2018.
Danish Patent and Trademark Office 1st Technical Examination of Patent Application No. PA 2016 71038 dated Jul. 16, 2017.
Chinese Office Action for Application No. 201780079009.8 dated Mar. 31, 2020.

* cited by examiner

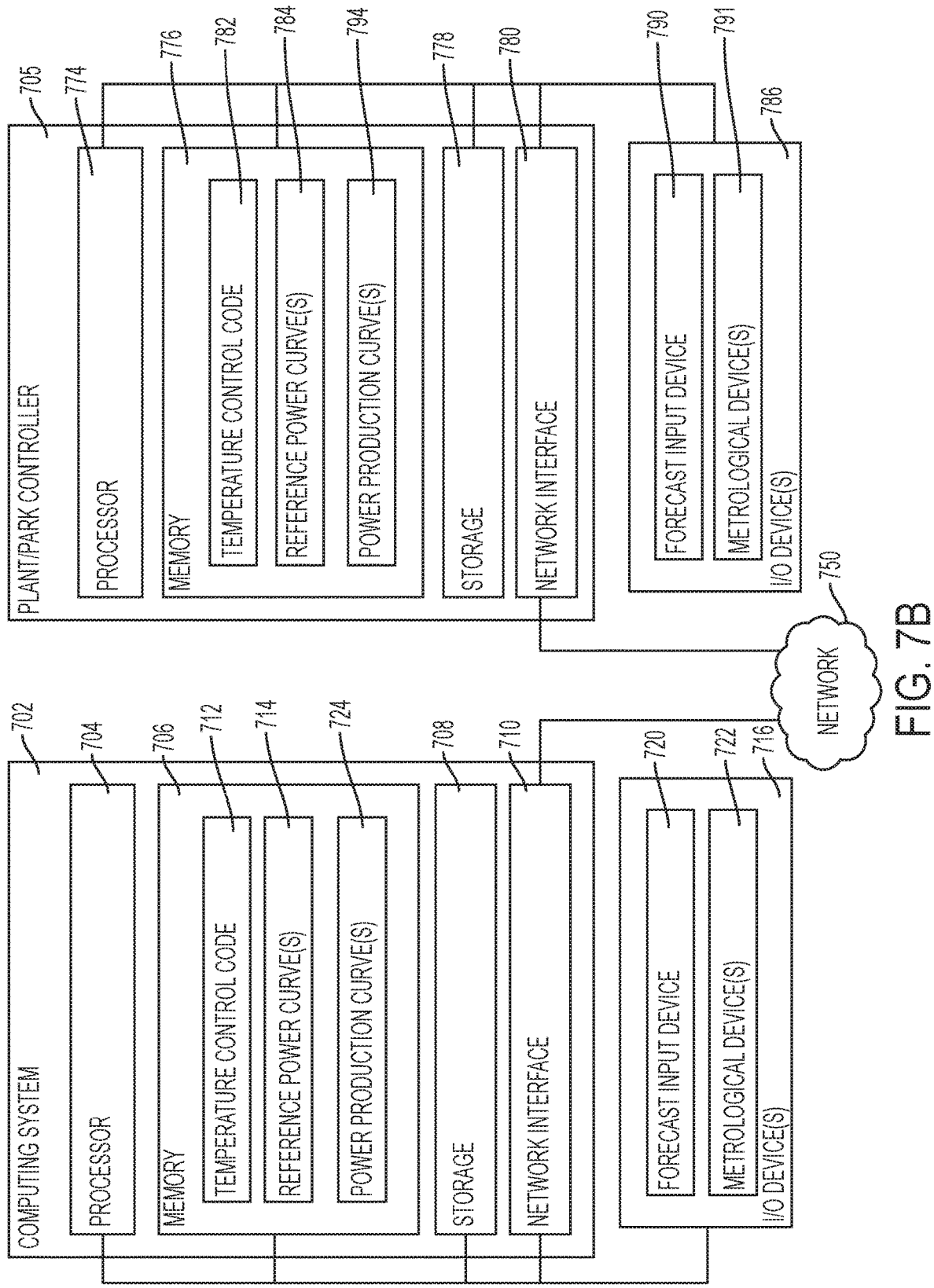

TEMPERATURE CONTROL BASED ON WEATHER FORECASTING

BACKGROUND

Field

Examples presented in this disclosure generally relate to techniques for controlling a temperature of a blade, such as a blade in a wind turbine system based on weather forecasting.

Description of the Related Art

Modern power generation and distribution networks increasingly rely on renewable energy sources, such as wind turbines. In some cases, the wind turbines may be substituted for conventional, fossil fuel-based generators. The formation of ice on the surface of the blades of a wind turbine is a relatively common problem, even in moderate climates. The build-up and spread of ice on the blade surface, in particular on the tip portion of the blade, changes the blade aerodynamics and may also lead to increased vibrations and loading on the blade, all of which lead to a reduction in power output. In more severe cases, the turbine may need to be shut down upon accumulation of ice to prevent excessive loading of the blades, which may damage or prematurely fatigue the blade components.

To prevent ice from accumulating on the blades, the wind turbines have been equipped with heating systems. The heating systems prevent the accumulation of ice on blades (anti-icing) and remove the ice from the blades after the ice accumulation (de-icing). A plurality of electro-thermal heat (ETH) panels may be utilized as a heating system. The ETH panels may be embedded in each blade and powered on to prevent ice accumulation. Alternatively, heated air may be circulated through internal blade cavities. Conventional systems use power curve monitoring to identify icing conditions so that a de-ice or anti-ice cycle may be triggered. The conventional power curve monitoring relies on historical data, compiled over a number of years, in the form of a reference power curve as a benchmark for current weather conditions. If the current weather conditions used to generate a measured power curve deviate from the reference power curve by a threshold amount, a de-ice or anti-ice cycle is triggered without taking into account future weather conditions. This may result in a substantial net energy loss. Therefore, there is a need for an improved heating system.

SUMMARY

One example of the present disclosure is a method of controlling a temperature of a blade. The method includes inputting current weather conditions and future weather conditions into a processor, generating a first power production, generating a second power production curve based on future weather conditions, comparing the first power production curve to the second power production curve, determining which power production curve minimizes a new power production loss of the blade, and adjusting a heating cycle of the blade based on the power production curve that minimizes the net power productions loss of the blade. Generating a first power production curve includes generating a measured power curve based on the current weather conditions, comparing the measured power curve to a reference power curve, and determining when to heat the blade based on a percentage drop between the measured power curve and the reference power curve.

Another example of the present disclosure relates to a system for controlling a temperature of a blade. The system includes a processor and a memory. The memory stores program code, which, when executed on the processor, performs an operation for controlling a temperature of a blade. The operation includes inputting current weather conditions and future weather conditions into a processor, generating a first power production, generating a second power production curve based on future weather conditions, comparing the first power production curve to the second power production curve, determining which power production curve minimizes a new power production loss of the blade, and adjusting a heating cycle of the blade based on the power production curve that minimizes the net power productions loss of the blade. Generating a first power production curve includes generating a measured power curve based on the current weather conditions, comparing the measured power curve to a reference power curve, and determining when to heat the blade based on a percentage drop between the measured power curve and the reference power curve.

Another example of the present disclosure relates to a computer readable storage medium for controlling a temperature of a blade. The computer readable storage medium has stored thereon instructions that, when executed by a processor, cause the processor to perform a method of controlling a temperature of a blade. The method includes inputting current weather conditions and future weather conditions into a processor, generating a first power production, generating a second power production curve based on future weather conditions, comparing the first power production curve to the second power production curve, determining which power production curve minimizes a new power production loss of the blade, and adjusting a heating cycle of the blade based on the power production curve that minimizes the net power productions loss of the blade. Generating a first power production curve includes generating a measured power curve based on the current weather conditions, comparing the measured power curve to a reference power curve, and determining when to heat the blade based on a percentage drop between the measured power curve and the reference power curve.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

To facilitate understanding, identical reference numerals have been used, where possible, to designate identical elements that are common to the figures. It is contemplated that elements disclosed in one example may be beneficially utilized on other examples without specific recitation.

DESCRIPTION OF EXAMPLE EMBODIMENTS

Examples are generally directed to techniques for controlling a temperature of a blade, such as a blade in a wind turbine system. One example of the present disclosure is a method of controlling a temperature of a blade. The method includes setting a target temperature, inputting physical conditions of the blade and ambient conditions about the blade into a processor, outputting a minimum amount of energy to a heating element of the blade required to reach the target temperature based on the physical conditions and ambient conditions, and adjusting the energy provided to the heating element to reach the target temperature.

Figure 1:
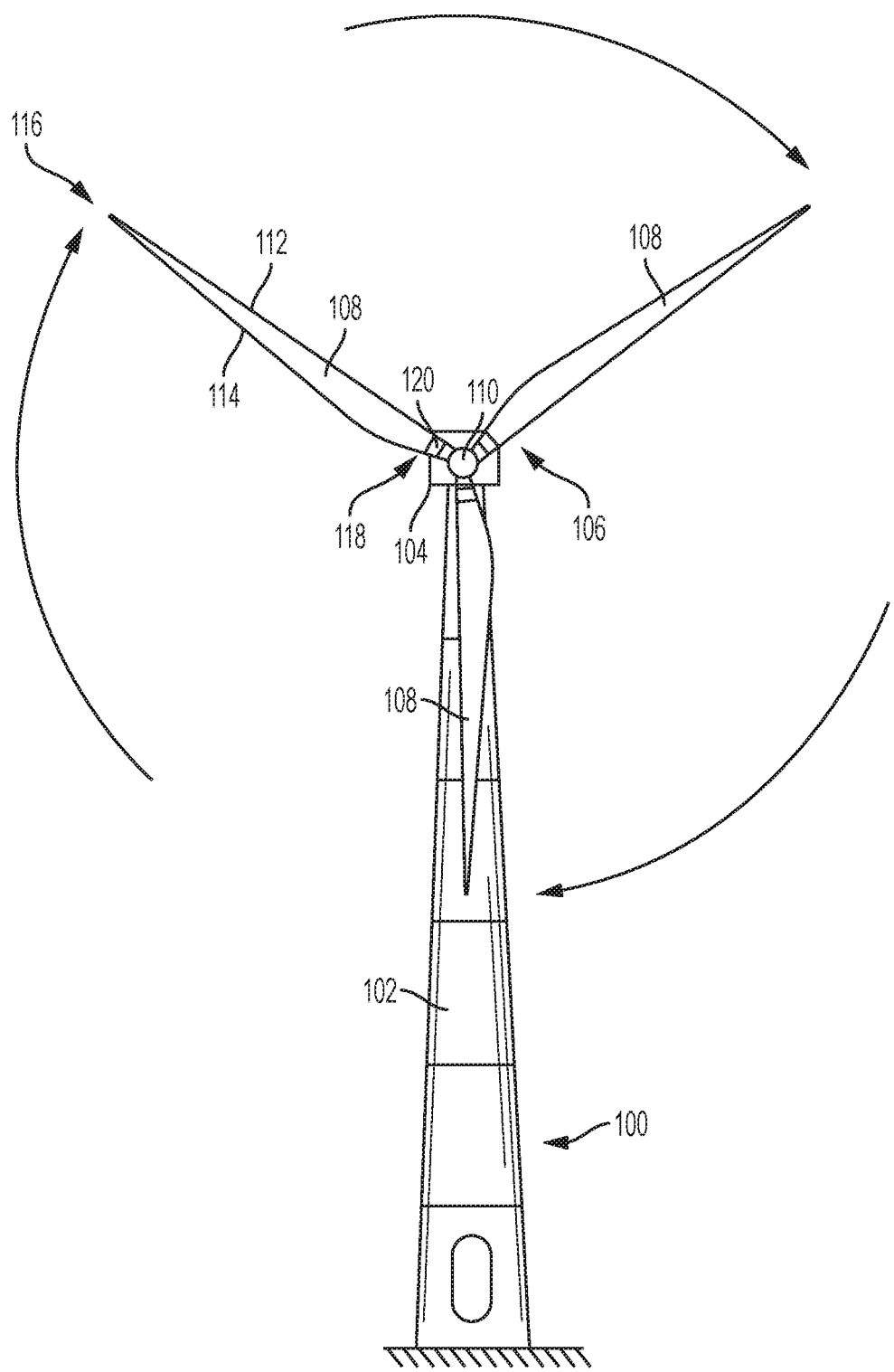
FIG. 1 illustrates a diagrammatic view of a horizontal-axis wind turbine generator (WTG), according to one example.

FIG. 1 illustrates a diagrammatic view of a horizontal-axis wind turbine generator (WTG) 100. The WTG 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as two, four, five, or more blades. The blade 108 typically has an aerodynamic shape with a leading edge 112 for facing into the wind, a trailing edge 114 at the opposite end of a chord for the blade 108, a tip 116, and a root 118 for attaching to the hub 110 in any suitable manner. For some examples, the blades 108 may be connected to the hub 110 using pitch bearings 120 such that each blade 108 may be rotated around its longitudinal axis to adjust the blade's pitch.

Figure 2:
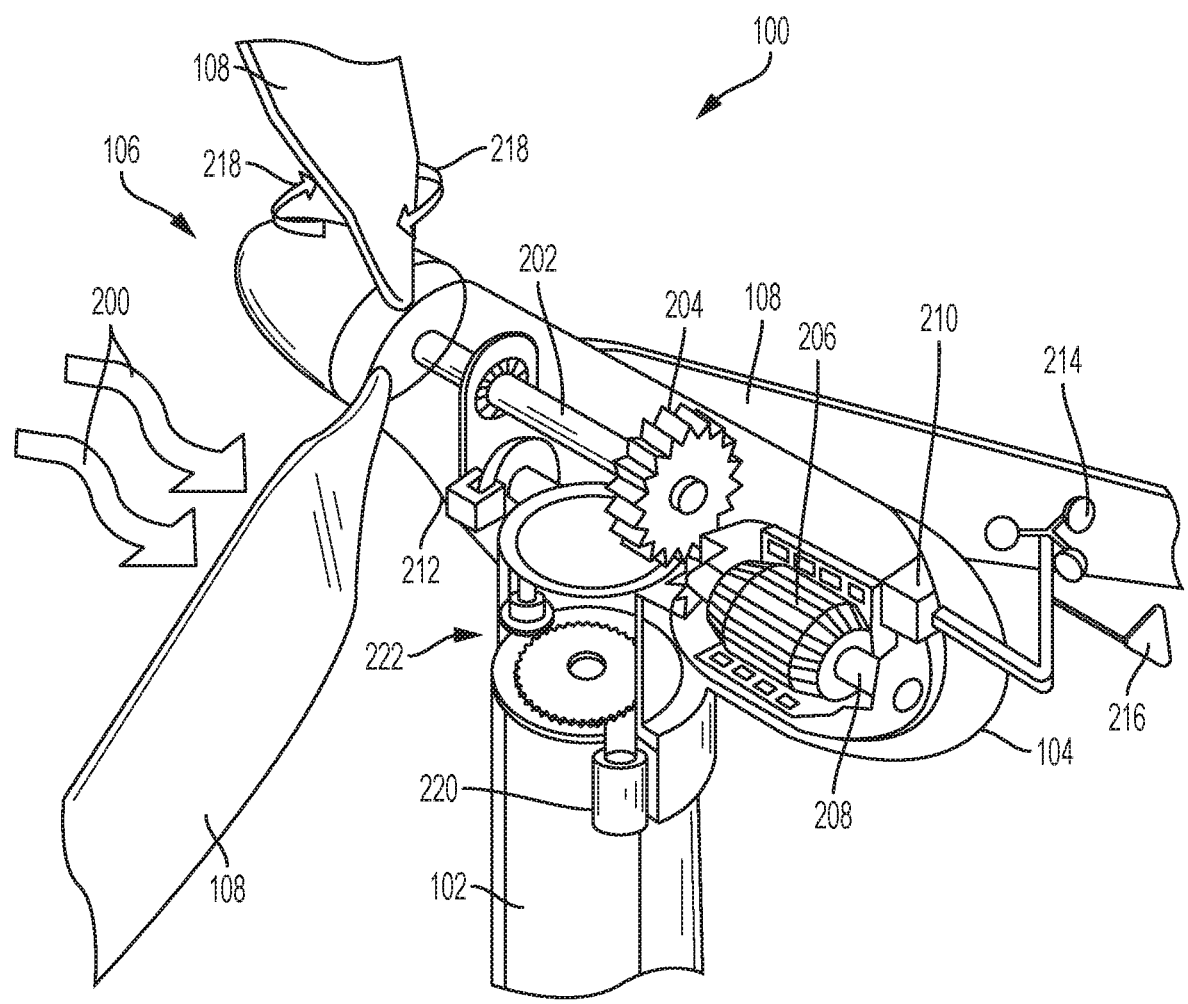
FIG. 2 illustrates a diagrammatic view of typical components internal to the nacelle and tower of the WTG of FIG. 1, according to one example.

FIG. 2 illustrates a diagrammatic view of typical components internal to the nacelle 104 and tower 102 of the WTG 100. When the wind 200 impacts on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206. The WTG 100 may also include a braking system 212 for emergency shutdown situations and/or to lock the rotor in a required position.

A controller 210 may sense the rotational speed of one or both of the shafts 202, 208. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
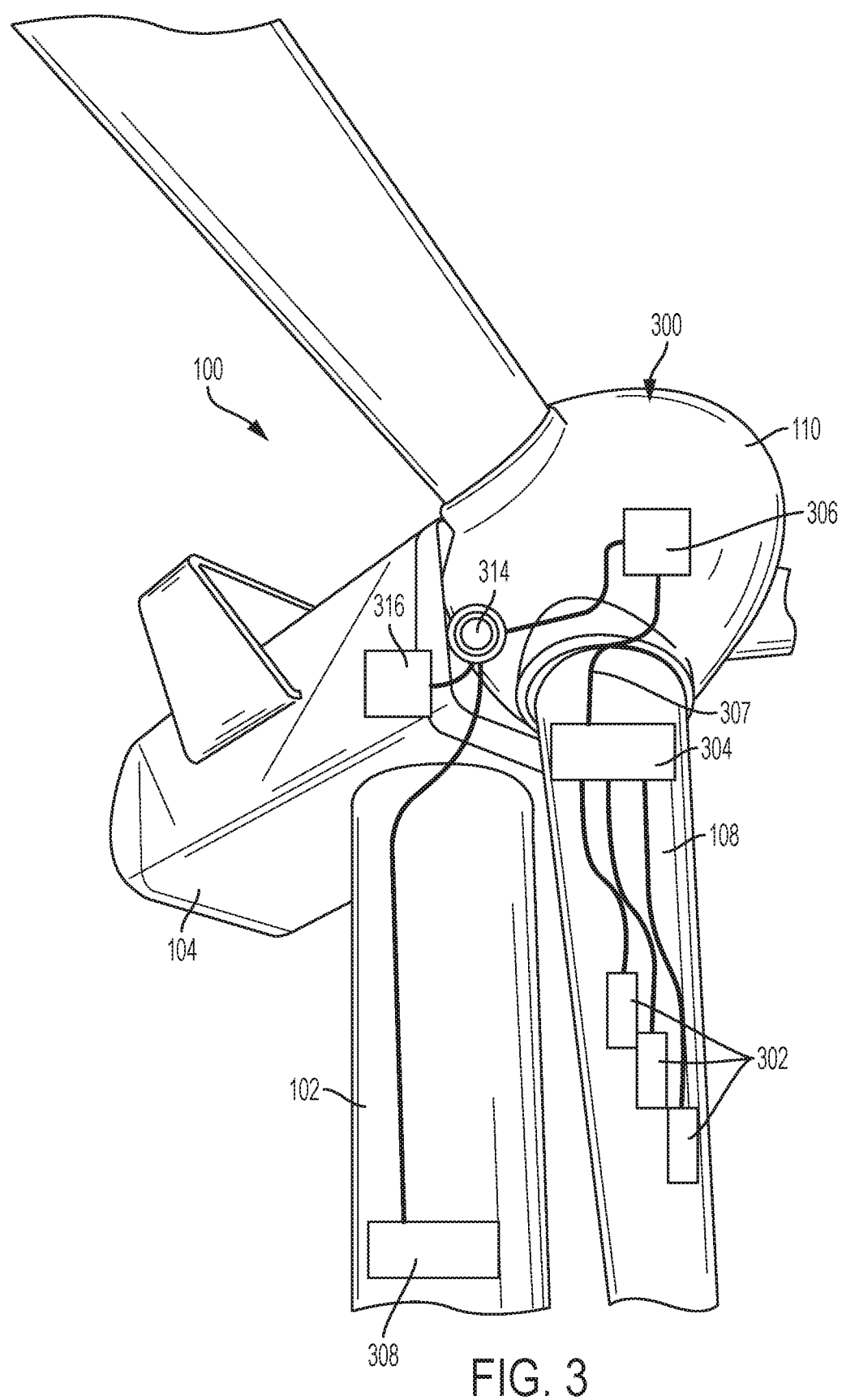
FIG. 3 is a schematic view of a control system for one or more electro-thermal heating (ETH) panels inside the WTG of FIG. 1, according to one example.

In cold climate regions, ice may form on the blades 108, which can reduce the speed of the rotation of the blades 108. In order to maintain an ice free surface on the blades 108, one or more Electro Thermal Heat (ETH) panels may be utilized. FIG. 3 is a schematic view of a control system 300 for one or more ETH panels 302 inside the WTG 100. The control system 300 may include a plurality of blade control and power distribution boxes 304, hub control and power distribution box 306, a slip ring 314, a power source 316, and a system controller 308. The one or more ETH panels 302 may be embedded in each blade 108 and may be controlled by blade control and power distribution boxes 304 located in the root 118 of each blade 108. There may be one blade control and power distribution boxes 304 for each blade 108. In one example, there are up to 32 ETH panels 302 embedded in each blade 108, such as 16 ETH panels 302 covering the windward blade surface 112 and 16 ETH panels 302 covering the leeward blade surface 114. In one example, the one or more ETH panels 302 cover the entire blade 108 except for the root 118. Electrical power may be supplied to the one or more ETH panels 302 from blade power and distribution box 304 located in the blade root. The blade power and distribution box 304 may include relays for switching on and off the one or more ETH panels 302 in each blade 108. The blade power and distribution box 304 may also include lightning protection components. From the blade power and distribution box 304, power cables are routed to each ETH panel 302. In one example, the WTG 100 includes one or more power cables 307 that connect the hub power and distribution box 306 to a corresponding blade power and distribution box 304 located in a corresponding blade 108.

The hub control and power distribution box 306 may be electrically connected a slip ring 314 located inside the nacelle 104. The slip ring 314 may be electrically connected to a power source 316 located inside the nacelle 104. The Power Source 316 may include a circuit breaker switch to allow the system to be de-energized. Electrical power may be supplied from the power source 316 through the hub interface of the nacelle 104 via the slip ring 314 and may be supplied to the one or more ETH panels 302 in each blade 108 via the slip ring 314, the hub control and power distribution box 306, and the blade control and power distribution box 304. The control and operation of the control system 300 may be achieved by remote connection via the system controller 308 and communication through the slip ring 314. The system controller 308 may be connected to the slip ring 314 to allow communication to the hub control and power distribution box 306. Each blade control and power distribution box 304 may be electrically connected to a communication link through the slip ring 314. Control signals provided to the blade control and power distribution box 304 from the system controller 308 are communicated through the slip ring 314. In one example this may be through a wireless link. In another example this may be through and electrical or optical fibre link.

The control system 300 may utilize duty cycling (i.e., switching on and off relays over a period of time) to achieve power distribution across the one or more ETH panels 302 in each blade 108. During severe icing conditions ideally all of the ETH panels 302 embedded in the blades 108 should be switched on continuously. The slip ring 314 may have a power or current constraint which will restrict the energy drawn from the power source 316 to the ETH Panels 302. To maximize the potential power available to the ETH panels 302, the control system 300 will focus on a fixed and predetermined set of zones having combined energy consumption less than the capabilities of the slip ring 314.

Figure 4A:
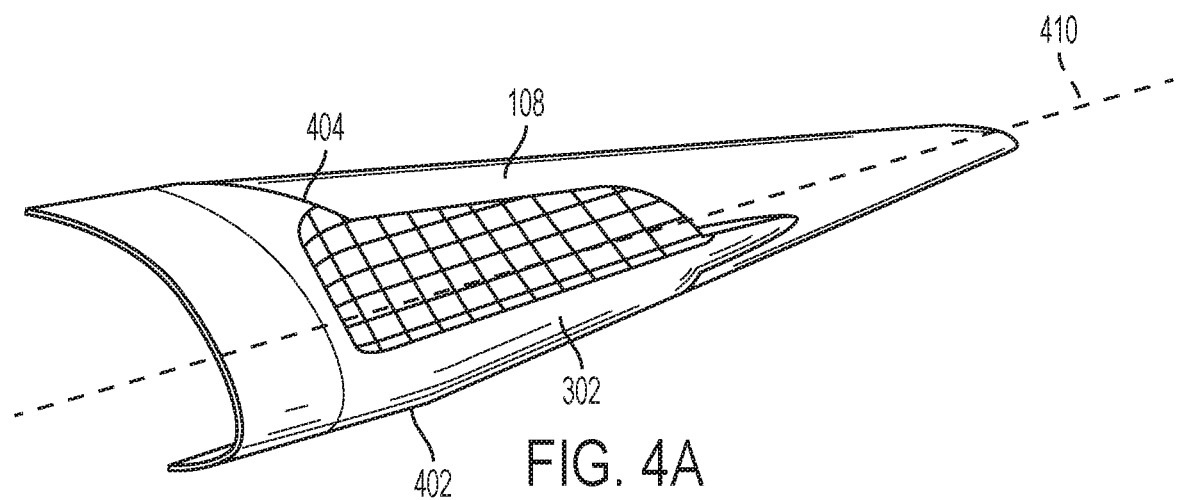
FIGS. 4A-4B are perspective views of the blade of FIG. 1, showing a portion of the embedded ETH panel, according to one example.
Figure 4B:
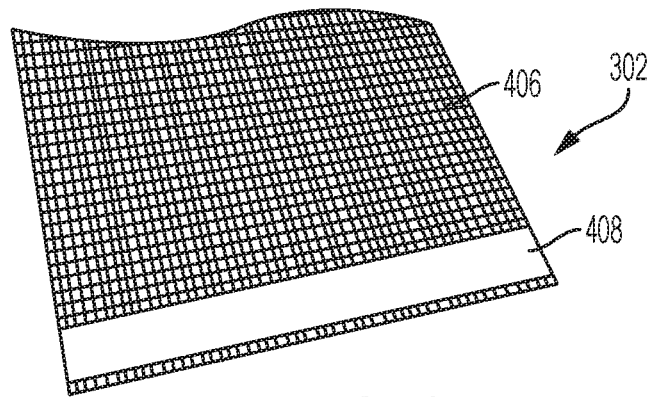

FIG. 4A is a perspective view of the blade 108 showing a portion of the embedded ETH panel 302. As shown, the ETH panel 302 may be embedded in the blade 108, such as between a first layer 402 and a second layer 404 of the blade 108. The ETH panel 302 may be any suitable resistive heating element. In one example, each ETH panel 302 includes a carbon mesh 406 and a busbar 408 disposed across the carbon mesh 406 for supplying power to the carbon mesh 406, as shown in FIG. 4B.

Conventional systems use power curve monitoring to identify icing conditions so that a de-ice or anti-ice cycle may be triggered. The conventional power curve monitoring relies on historical data, compiled over a number of years, in the form of a reference power curve as a benchmark for current weather conditions. If the current weather conditions used to generate a measured power curve deviate from the reference power curve by a threshold amount, a de-ice or anti-ice cycle is triggered without taking into account future weather conditions. This may result in a substantial net energy loss.

Figure 5:
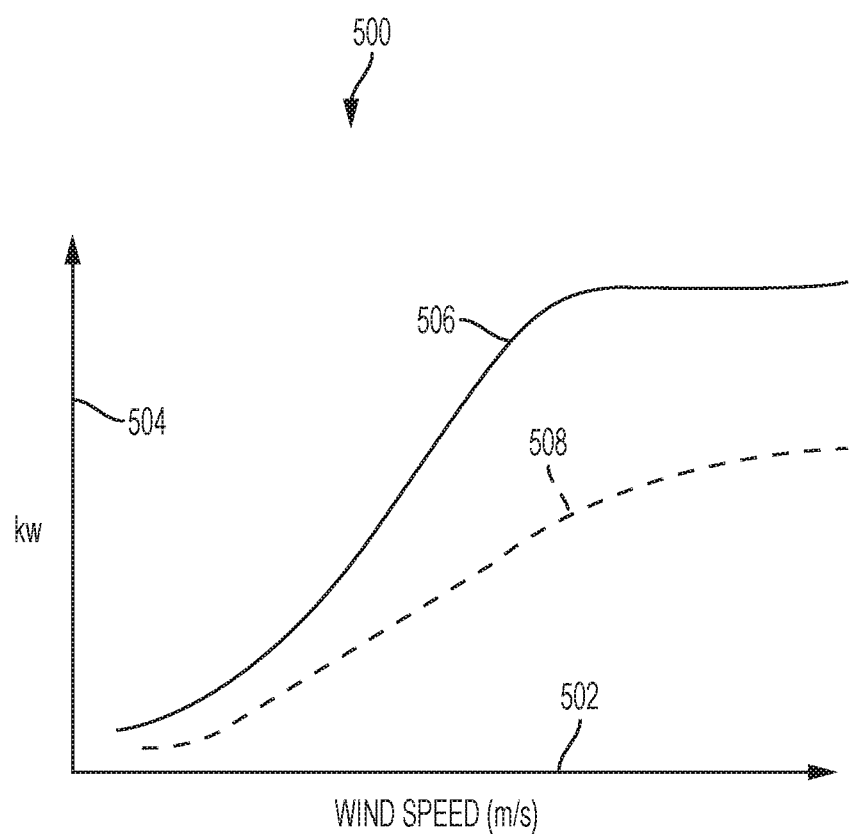
FIG. 5 is a graph showing an example of a conventional system using power curve monitoring.

FIG. 5 is a graph 500 showing an example of a conventional system using power curve monitoring. The graph 500 measures wind speed in meters per second (m/s) along an x-axis 502 and power in kilowatts (kW) along a y-axis 504. The graph 500 includes a reference power curve 506. The reference power curve 506 illustrates the relationship between power and wind speed based on historical data. The reference power curve 506 is used as a benchmark for current weather conditions. The graph 500 further includes a measured power curve 508. The measured power curve 508 is generated from metrological data of current weather conditions within a prescribed temperature envelope. To determine whether there are icing conditions, a processor compares the measured power curve 508 to the reference power curve 506. If the measured power curve 508 deviates from the reference power curve 506 by a given amount, then the processor determines that there are icing conditions. For example, the measured power curve 508 deviating from the reference power curve 506 by 5-30% corresponds to an icing condition. The point at which the measured power curve 608 deviates from the reference power curve a threshold amount is referred to as the "trigger selection point". The processor may set the blade into a heating cycle, such as a de-ice cycle or an anti-ice cycle, when the processor determines there is an icing condition, i.e., when the trigger selection point is met. In those examples where the heating cycle is a de-ice cycle, then the aim is to remove ice accretion from the blades and the wind turbine is either stopped (i.e. no longer rotating) or running (i.e. rotating) and the ETH panels are turned on. In those examples where the heating cycle is an anti-ice cycle, the aim is to prevent ice accretion from forming on the blades and the wind turbine remains running, while the ETH panels are turned on.

Because the conventional system only relies on the historical data of the reference power curve 506 to determine if there is an icing condition, the conventional system does not take into account future weather condition improvements.

Figure 6A:
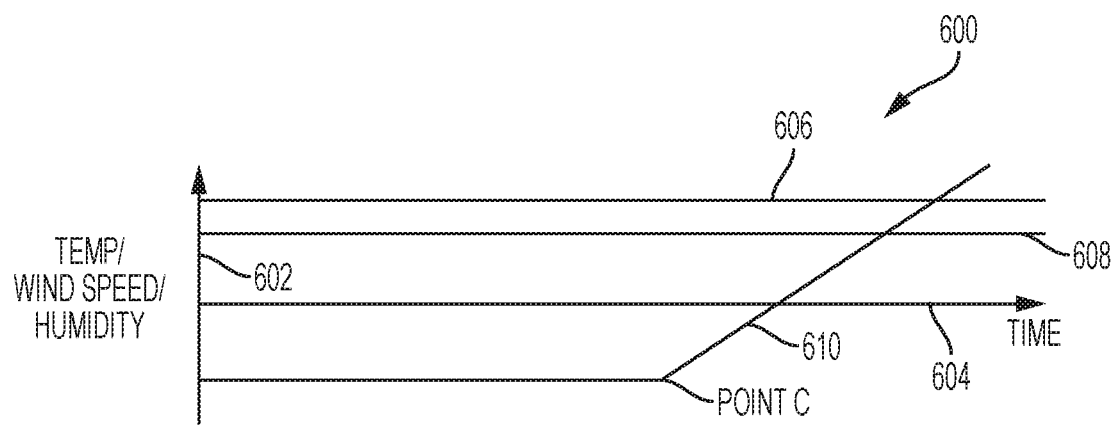
FIG. 6A is a graph illustrating weather condition, according to one example.

For a de-icing turbine, FIG. 6A illustrates one example of weather conditions. Graph 600 illustrates the temperature, wind speed, and humidity (liquid water content of air) along a y-axis 602 and the time along an x-axis 604. The humidity is represented by curve 606. The wind speed is represented by curve 608. The temperature is represented by curve 610. In graph 600, the wind speed and the temperature remain constant as the temperature increases over time.

Figure 6B:
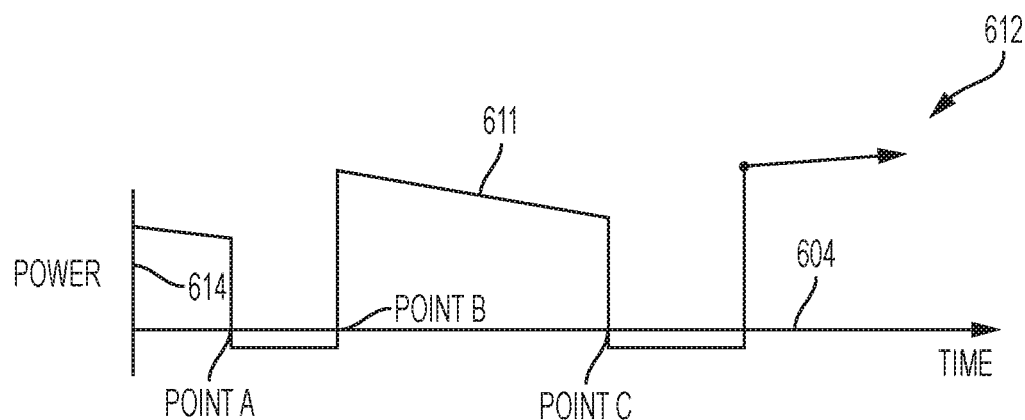
FIG. 6B illustrates a power production curve of a blade under the weather conditions illustrated in FIG. 6A using the conventional system, according to one example.

FIG. 6B illustrates a power production curve 611 of a blade under the weather conditions illustrated in graph 600 using the conventional system. Graph 612 illustrates the power generation of a blade along the y-axis 614 versus the time along x-axis 604, which is shared with graph 600. Graph 612 and graph 600 share the same x-axis. At a time, point A, the conventional system triggers a first heating event. The combination of temperature, humidity, wind speed, and duration of those variables at point A generated a point along a measured power curve that was a threshold value away from the reference power curve. Thus, this combination triggers a first heating event. At point B, the blade comes out of the heating cycle and begins producing power. As the temperature curve 610 and humidity level 606 remains constant, the power of the blade begins to decrease as icing conditions continue. At point C, the conventional system triggers a second heating event. However, at point C, the temperature curve 610 begins an upward ascent as the ambient temperature increases. By the time the heating event is completed at point D, the temperature has crossed the x-axis 604. This illustrates that the second heating event may have been avoided if the processor relied on future weather conditions as opposed to historical weather conditions.

Figure 6C:
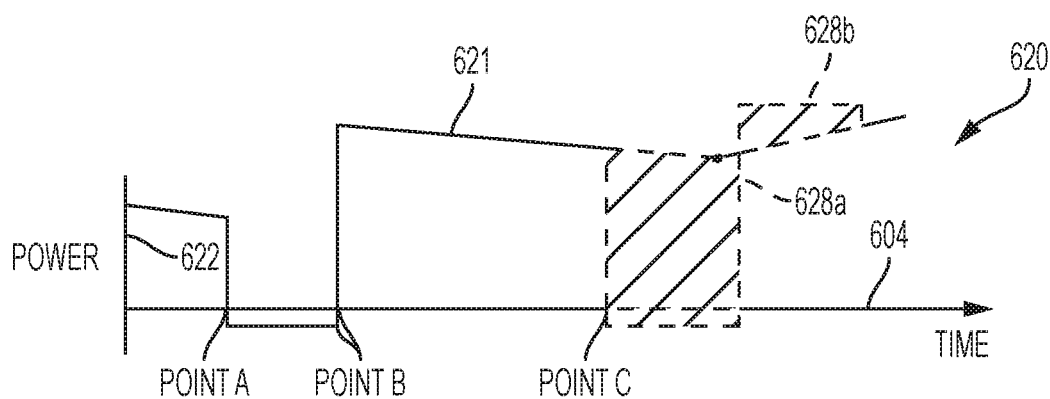
FIG. 6C illustrates a power production curve of a blade under the weather conditions illustrated in FIG. 6A using future weather conditions, according to one example.

FIG. 6C demonstrates the benefit of forecasting. The shaded area represents the energy saved by not triggering the second heating cycle. The use of accurate weather forecasting combined with the existing reference power curve based on historical data helps increase the certainty of identifying an icing event, which leads to a net save in energy. FIG. 6C will be revisited and discussed in further detail below.

Figure 7A:
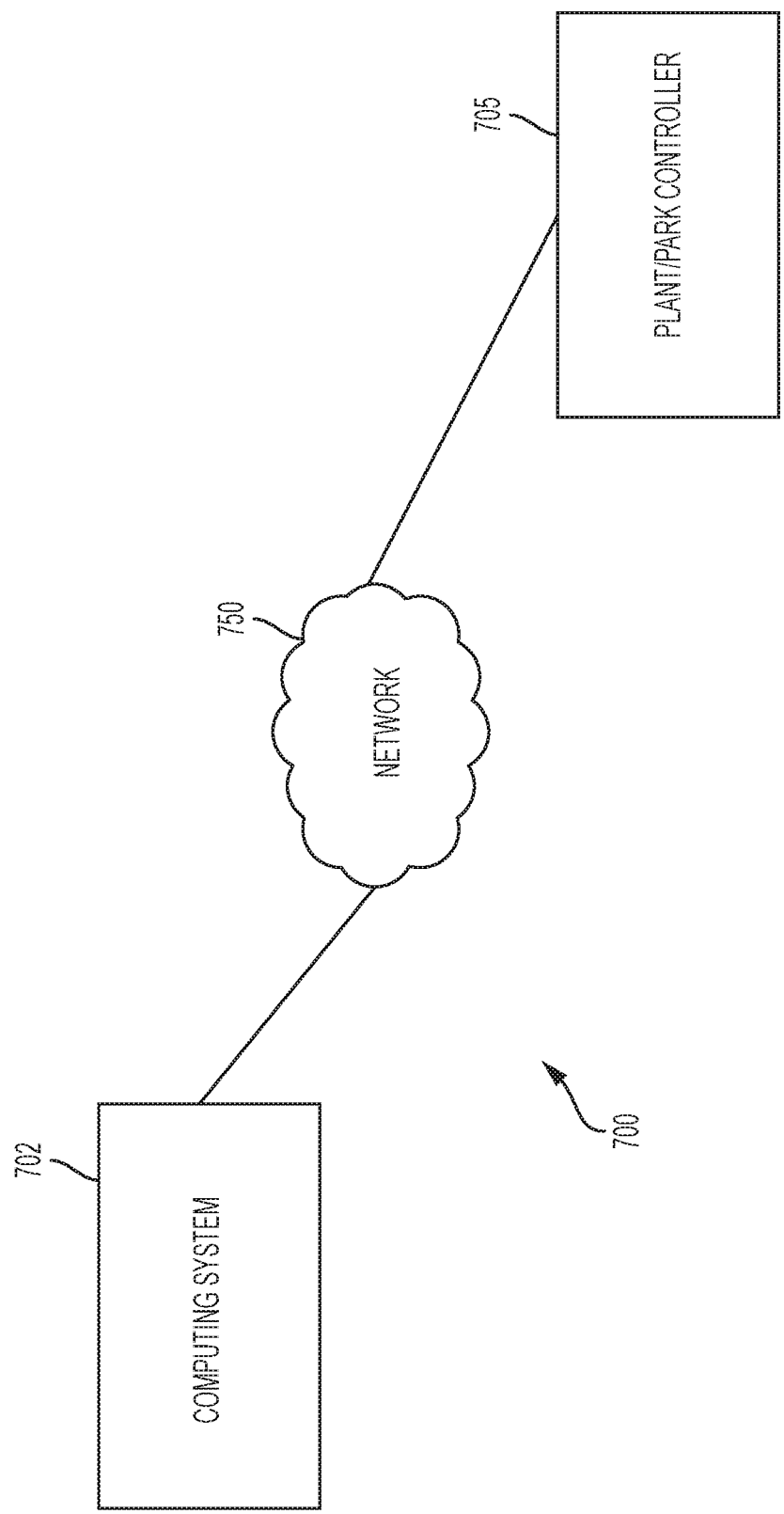
FIG. 7 illustrates one example of a computing system, which is configured to carry out a method for controlling the temperature of a blade in a wind turbine system.

FIGS. 7A-7B are block diagrams illustrating a networked system configured to carry out a method for controlling the temperature of a blade, such as a blade in a wind turbine system. In the depicted example, the system 700 includes one or more computing systems 702 for one or more WTGs 100 and a plant/park controller 705, connected by a network 750. Generally, the computing system 702, such as system controller 308, is configured to carry out a method for controlling the temperature of a blade. The plant/park controller 705 is configured to control one or more WTGs 100 disposed in a wind turbine site. In one example, the computing system 702 alone is configured to carry out the method for controlling the temperature of the blade. In another example, the plant/park controller 705 alone is configured to carry out the method for controlling the temperature of the blade by communicating with each computing system 702 over the network 750. In yet another example, the plant/park controller 705 and the computing system 702 work in together in carrying out the method for controlling the temperature of the blade.

Referring now to FIG. 7B, FIG. 7B is a block diagram of a networked computer system configured to carry out a method for controlling the temperature of a blade, according to one example. The computing system 702 includes a processor 704, a memory 706, storage 708, and a network interface 710. The processor 704 is included to be representative of a single processor, multiple processors, a single processor having multiple processing cores, and the like. The storage 708 may be a hard disk drive or a solid state drive. Although shown as a single unit, the storage 708 may be a combination of fixed and/or removable storage devices, such as fixed drives, removable memory cards, optical storage, network attached storage (NAS), or storage-area-network (SAN). The network interface 710 may be any type of network communications allowing the computing system 702 to communicate with other computers via a network 750.

The computing system 702 also includes I/O devices 716 (e.g., keyboard and mouse devices) connected to the computing system 702. For example, the I/O devices 716 may include forecast input device 720 and metrological device(s) 722. The forecast input device 720 is linked to a weather service, and provides forecast updates the processor 704. The metrological device 722 measures ambient conditions surrounding the blade, such as wind speed, liquid water content of air (humidity), and temperature. In the examples in which the computing system 702 carries out the method for controlling the temperature of the blade, the metrological device 722 measures the ambient conditions surrounding the blade for the WTG in which the computing system 702 resides. Additionally, the forecast is provided directly to the computing system 702 in the WTG 100.

The memory includes temperature control code 712, reference power curves 714, and power production curves 724. The reference power curves 714 include the reference power curve for each blade based on historical weather information. The reference power curves 714 reflect relationship between energy and wind speed based on historical data for both de-icing and anti-icing heating systems. The processor 704 is programmed to execute the temperature control code 712, which implements a method of controlling the temperature of a blade described below in conjunction with FIG. 8. The temperature control code 712 is configured to generate power production curves 724 for each blade: a first power production curve based on the reference power curves compared to the current weather conditions; and a second power production curve based on the forecasting information compared to the current weather conditions.

The plant/park controller 705 includes a processor 774, a memory 776, storage 778, and a network interface 780. The processor 774 is included to be representative of a single processor, multiple processors, a single processor having multiple processing cores, and the like. The storage 778 may be a hard disk drive or a solid state drive. Although shown as a single unit, the storage 778 may be a combination of fixed and/or removable storage devices, such as fixed drives, removable memory cards, optical storage, network attached storage (NAS), or storage-area-network (SAN). The network interface 780 may be any type of network communications allowing the plant/park controller 705 to communicate with other computers via a network 750.

The plant/park controller 705 also includes I/O devices 786 (e.g., keyboard and mouse devices) connected to the plant/park controller 705. For example, the I/O devices 786 may include forecast input device 790 and metrological device(s) 792. The forecast input device 790 is linked to a weather service, and provides forecast updates the processor 774. The metrological device 792 measures ambient conditions surrounding the blade, such as wind speed, liquid water content of air (humidity), and temperature. In the examples in which the plant/park controller 705 carries out the method for controlling the temperature of the blade, the metrological device 722 measures the ambient conditions on the wind turbine plant, and provides the ambient conditions to each computing system 702 in each WTG over the network 750. Additionally, the forecast information is provided directly to the plant/park controller 705 via to the forecast input device 790. The plant/park controller 705 then provides the forecast information to each computing system 702 in each WTG 100 over the network 750. In those examples in which the plant/park controller 705 works in tandem with the computing system 702 to carry out the method for controlling the temperature of the blade, the plant/park controller 705 receives forecast information and measures the ambient conditions of the wind turbine plant, and provides this information to each computing system 702 in each WTG in addition to each computing system 702 receiving individual forecast information and measuring individual ambient conditions, specific to the WTG in which the computing system 702 resides.

In one example, the memory 776 includes temperature control code 782, reference power curves 784, and power production curves 794. The reference power curves 784 include the reference power curve for each blade based on historical weather information. The reference power curves 784 reflect relationship between energy and wind speed based on historical data for both de-icing and anti-icing heating systems. The processor 774 is programmed to execute the temperature control code 782, which implements a method of controlling the temperature of a blade described below in conjunction with FIG. 8. The temperature control code 782 is configured to generate power production curves 794 for each blade: a first power production curve based on the reference power curves compared to the current weather conditions; and a second power production curve based on the forecasting information compared to the current weather conditions. The processor 774 then communicates with the processor 704 based on the determination by the temperature control code 782.

Figure 8:
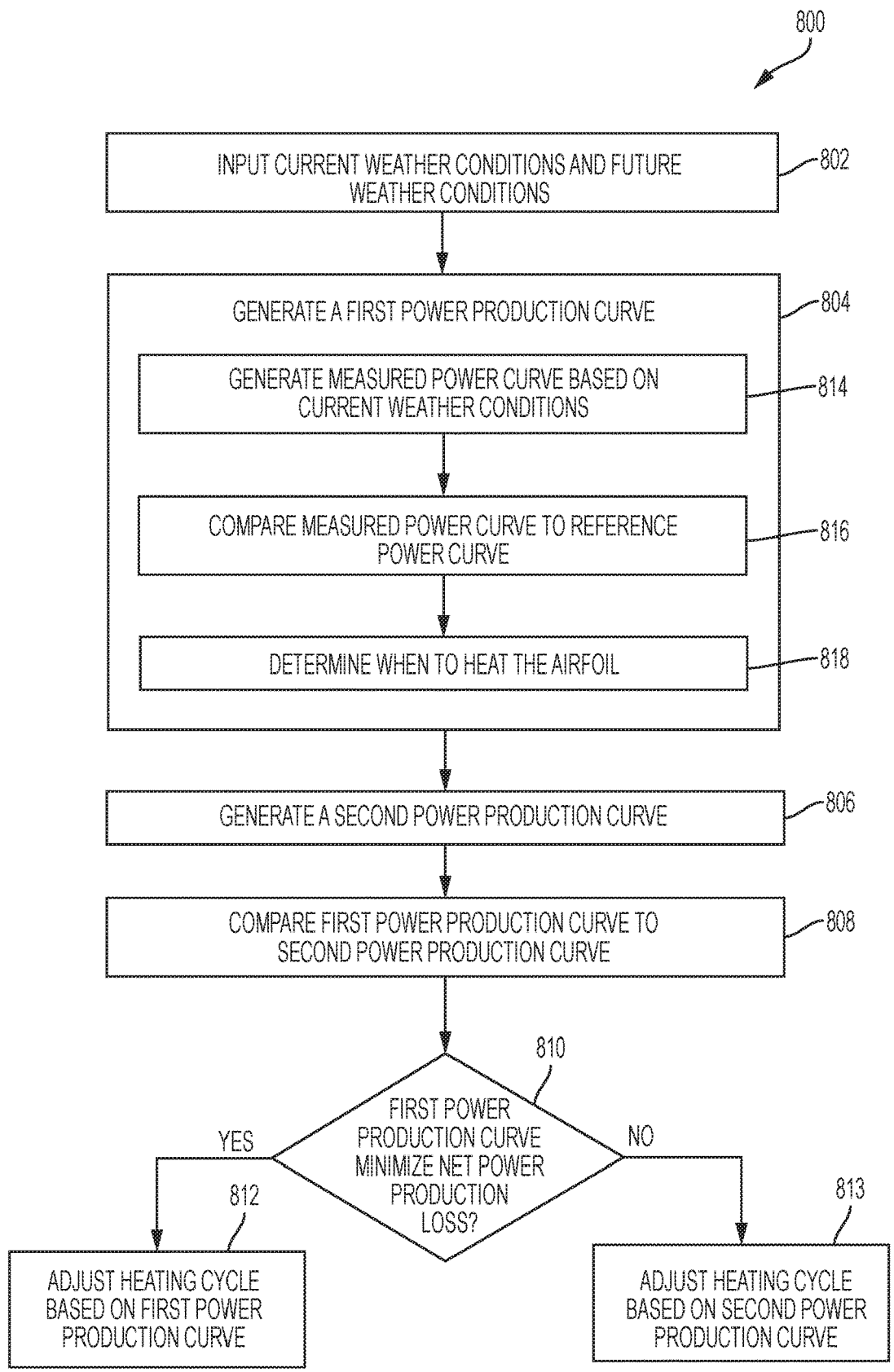
FIG. 8 is a flow diagram for controlling a temperature of a blade in a wind turbine system, according to one example.

FIG. 8 is a flow diagram 800 for controlling the temperature of a blade, such as a blade in a wind turbine system, according to one embodiment. The flow diagram 800 begins at step 802.

At step 802, current weather conditions and future weather conditions are inputted into a processor, such as processor 704 in computing system 702 or processor 774 in plant/park controller 705. In one example, the current weather conditions are inputted into the processor by metrological devices measuring the ambient conditions surrounding the blade. In another example, the future weather conditions are inputted into the processor by a forecasting device in communication with a weather service.

At step 804, the processor generates a first power production curve. Step 804 includes substeps 814, 816, and 818. At substep 814, the processor generates a measured power curve based on the current weather conditions. The measured power curve is similar to the measured power curve 508 in FIG. 5. At substep 816, the processor compares the measured power curve to a reference power curve. The reference power curve is similar to the reference power curve 506 in FIG. 5. The reference power curve is generated using historical weather information. At substep 818, the processor determines when to execute a heating event based on a threshold difference between the measured power curve and the reference power curve.

At step 806, the processor generates a second power production curve. The second power production curve is generated using future weather conditions inputted into the processor from forecast information. The second power production curve indicates the power produced by the blade and when the heating cycles for the blade will occur based on the future weather conditions.

At step 808, the processor compares the first power production curve to the second power production curve. At decision block 810, the processor determines which power production curve minimizes the net power production loss of the blade. If the processor determines that the first power production curve minimizes the net power production loss of the blade, then at step 812 the processor adjusts the heating cycle of the blade based on the first power production curve. If, however, the processor determines that the second power production curve minimizes the net power production loss of the blade, then at step 813 the processor adjusts the heating cycle of the blade based on the second power production curve. For example, the processor may delay, cancel, or trigger the heating cycle at an earlier time, based on the determination.

Example 1

Referring back to FIGS. 6A and 6B, FIG. 6A is a graph 600 illustrating the temperature, wind speed, and humidity over time and FIG. 6B is graph illustrating a power production curve of a blade under the weather conditions shown in FIG. 6A using the conventional system. FIG. 6C is a graph 620 illustrating a second power production curve 621 of a blade under the weather conditions shown in FIG. 6A using future weather conditions.

Graph 620 illustrates the power generation of the blade along the y-axis 622 versus the time along the x-axis 604. At the point A, the processor would trigger a first heating event, similar to graph 600, because the combination of temperature, humidity, wind speed, and the duration of those variables indicate icing conditions. At point B, the blade comes out of the heating cycle and begins producing power. Up to point C, the power generated by the blade under the conventional system, and the power generated by the blade under the improved system are the same. At point C, the temperature about the blade begins to rise, as evidenced by graph 600. Rather than entering into a heating cycle as shown in graph 612, the improved system looks to future weather conditions and sees that the temperature will begin to rise at point C. Therefore, the improved system continues to generate power while allowing the icing conditions to improve. The result of foregoing the heating cycle is a net power energy save which is equivalent to the shaded area 628a minus the shaded area 628b in FIG. 6C. The delay is justified on the high confidence that within a certain time after originally identifying an icing event at point C, available temperature readings will rise. Cancelling the heating cycle yields the net power energy save.

Example 2

Figure 9A:
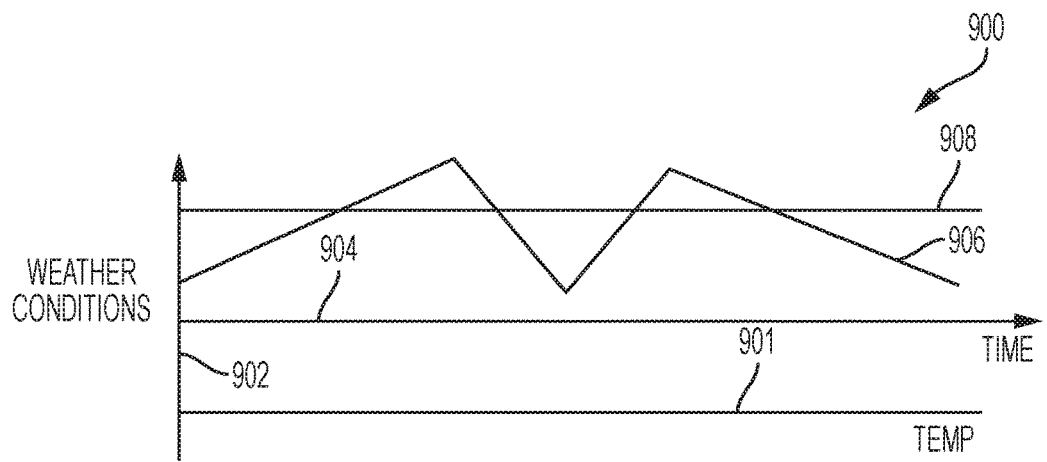
FIG. 9A is a graph illustrating weather conditions, according to one example.

FIG. 9A illustrates one example of weather conditions. Graph 900 illustrates the temperature, wind speed, and humidity along a y-axis 902 and the time along an x-axis 904. The humidity is represented by curve 906. The wind speed is represented by curve 908. The temperature is represented by curve 901. In graph 900, the wind speed and the temperature remain constant as the humidity fluctuates over time.

Figure 9B:
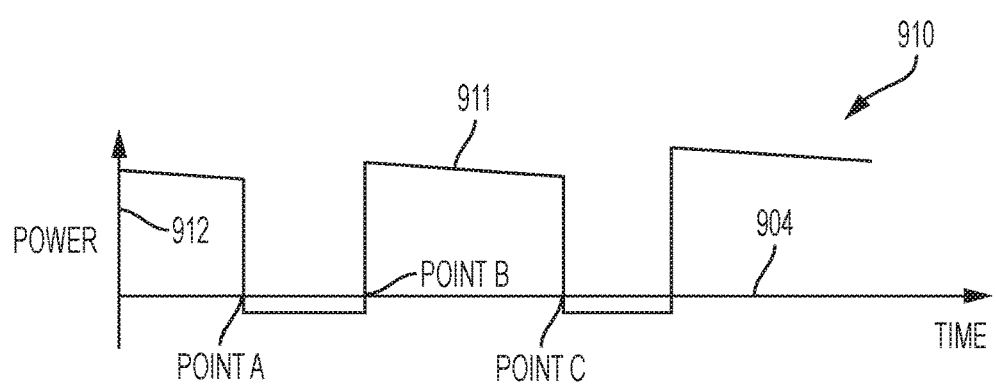
FIG. 9B illustrates a power production curve of a blade under the weather conditions illustrated in FIG. 9A using the conventional system, according to one example.

FIG. 9B illustrates a power production curve 911 of a blade under the weather conditions illustrated in graph 900 by comparing a reference power curve to a measured power curve. Graph 910 illustrates the power generation of the blade along the y-axis 912 versus the time along x-axis 904 given the weather conditions in graph 900. At a time A, the conventional system triggers a first heating event. The first heating event was triggered because the combination of temperature, humidity, and wind speed at point A generated a point along a measured power curve that was a threshold value away from the reference power curve. At point B, the humidity drops for a short interval, and the blade comes out of the heating cycle to begin producing power. As the humidity begins to rise, at point C the conventional system triggers a second heating event. Because the conventional systems does not take into account future weather conditions, the conventional system did not take into account the short interval drop in humidity between points B and C.

Figure 9C:
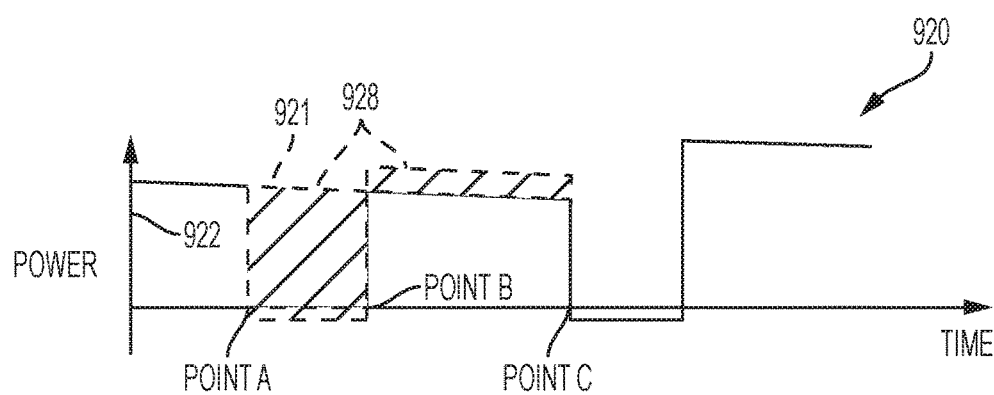
FIG. 9C illustrates a power production curve of a blade under the weather conditions illustrated in FIG. 9A using future weather conditions, according to one example.

FIG. 9C is a graph 920 illustrating a second power production curve 921 of a blade under the weather conditions shown in FIG. 9A using future weather conditions.

Graph 920 illustrates the power generation of the blade along the y-axis 922 versus the time along the x-axis 904. At the point A, instead of triggering a heating cycle, the processor takes into account the future weather conditions. Specifically, the processor takes into account that the humidity will drop for a short interval. Therefore, rather than triggering the heating cycle, the processor continues to run the blade. Although the blade generates a lower amount of power between points B and C compared to that of graph 910, graph 920 exhibits a net energy save 928. At point C, the processor would trigger a first heating event, similar to graph 910, because the combination of temperature, humidity, wind speed, and the duration of those variables indicate icing conditions.

Example 3

Figure 10A:
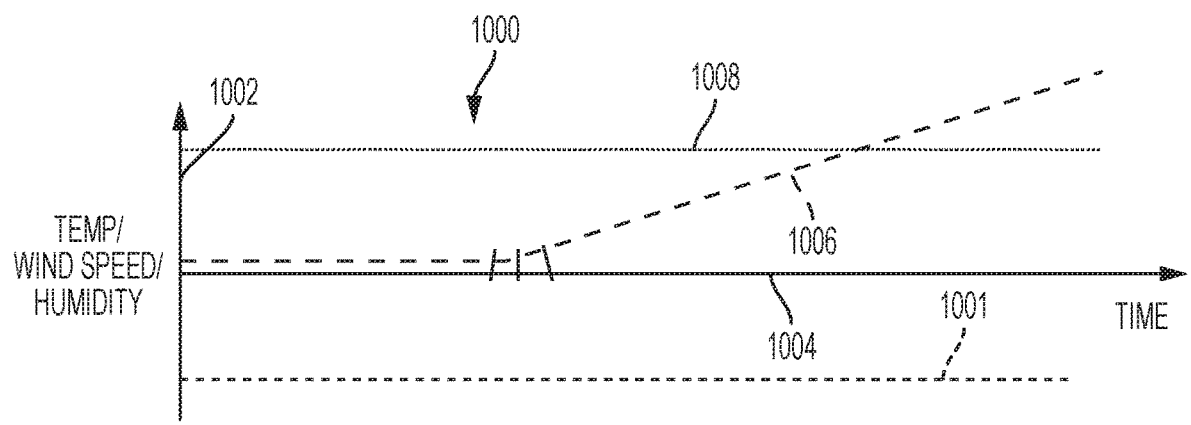
FIG. 10A is a graph illustrating weather condition, according to one example.

FIG. 10A illustrates one example of weather conditions. Graph 1000 illustrates the temperature, wind speed, and humidity along a y-axis 1002 and the time along an x-axis 1004. The humidity is represented by curve 1006. The wind speed is represented by curve 1008. The temperature is represented by curve 1001. In graph 1000, the humidity and the temperature remain constant as the wind speed fluctuates over time.

Figure 10B:
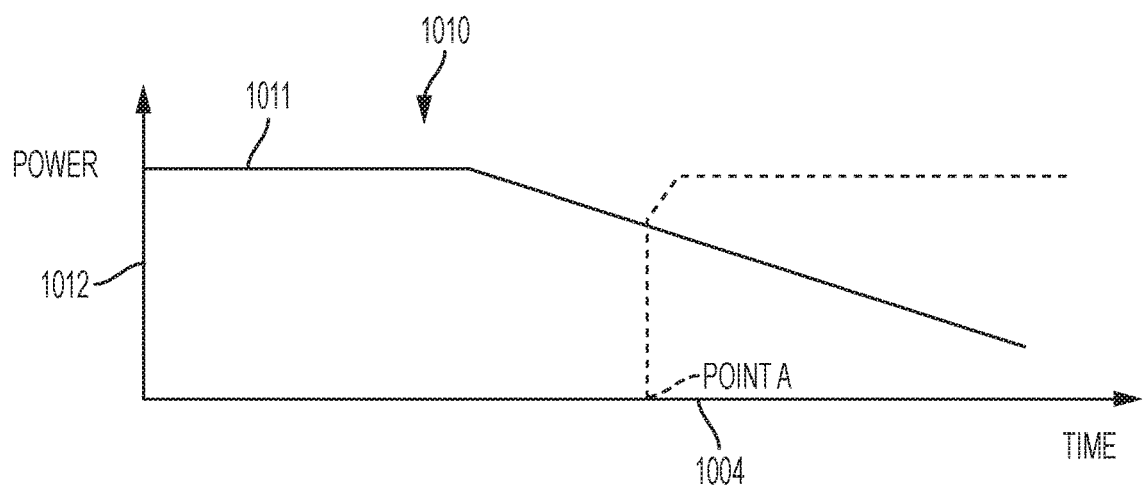
FIG. 10B illustrates a power production curve of a blade under the weather conditions illustrated in FIG. 10A using the conventional system, according to one example.

FIG. 10B illustrates a power production curve 1011 of a blade under the weather conditions illustrated in graph 1000 by comparing a reference power curve to a measured power curve. Graph 1010 illustrates the power generation of the blade along the y-axis 1012 versus the time along the x-axis 1004 given the weather conditions in graph 1000. At a point A, the conventional system triggers a heating event. For example, the conventional system triggers an anti-ice heating cycle. The first heating event was triggered because the combination of temperature, humidity, and wind speed at point A generated a point along a measured power curve that was a threshold value away from the reference power curve.

Figure 10C:
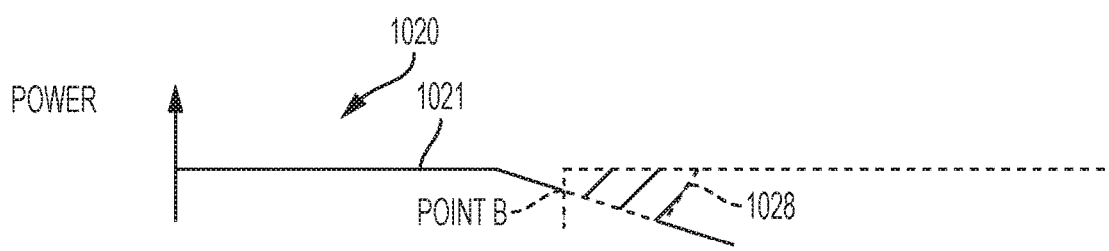
FIG. 10C illustrates a power production curve of a blade under the weather conditions illustrated in FIG. 10A using future weather conditions, according to one example.

FIG. 10C is a graph 1020 illustrating a second power production curve 1021 of a blade under the weather conditions shown in FIG. 10A using future weather conditions.

Graph 1020 illustrates the power generation of the blade along the y-axis 1022 versus the time along the x-axis 1004. At the point A, instead of triggering a heating cycle, the processor takes into account the future weather conditions. Specifically, the processor takes into account that the humidity will begin to rise. Therefore, rather than triggering the heating cycle at the later point A, the processor will trigger the heating cycle at an earlier time, before the humidity increases a greater amount leading to greater icing conditions As shown on graph 1020, the processor will begin the heating cycle at point B rather than point A. Triggering the heating cycle earlier in time yields a net energy save 1028.

In the preceding, reference is made to examples presented in this disclosure. However, the scope of the present disclosure is not limited to specific described examples. Instead, any combination of the preceding features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, examples, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the examples disclosed herein may be embodied as a system, method, or computer program product. Accordingly, aspects may take the form of an entirely hardware example, an entirely software example (including firmware, resident software, micro-code, etc.) or an example combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to examples presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of controlling a temperature of a blade, comprising:
inputting current weather conditions and future weather conditions into a processor;
generating a first power production curve, comprising:
generating a measured power curve based on the current weather conditions;
comparing the measured power curve to a reference power curve; and
determining when to heat the blade based on a percentage drop between the measured power curve and the reference power curve;
generating a second power production curve of the blade based on the future weather conditions;
comparing the first power production curve to the second power production curve;
determining which power production curve minimizes a net power production loss of the blade; and
adjusting a heating cycle of the blade based on the power curve that minimizes the net power production loss of the blade.

2. The method of claim 1, wherein the heating cycle is a de-ice cycle.

3. The method of claim 1, wherein the heating cycle is an anti-ice cycle.

4. The method of claim 1, wherein the future weather conditions are updated hourly.

5. The method of claim 1, wherein the current weather conditions and future weather conditions include wind speed, humidity, and temperature.

6. The method of claim 1, wherein adjusting a heating cycle of the blade comprises:
minimizing a number of de-ice cycles by delaying an occurrence of a de-ice cycle.

7. The method of claim 1, wherein adjusting a heating cycle of the blade comprises:
minimizing a number of anti-ice cycles by delaying an occurrence of an anti-ice cycle.

8. A system, comprising:
a processor; and
a memory storing program code, which, when executed on the processor performs an operation for controlling a temperature of a blade, the operation comprising:
inputting current weather conditions and future weather conditions into a processor;
generating a first power production curve, comprising:
generating a measured power curve based on the current weather conditions;
comparing the measured power curve to a reference power curve; and
determining when to heat the blade based on a percentage drop between the measured power curve and the reference power curve;
generating a second power production curve of the blade based on the future weather conditions;
comparing the first power production curve to the second power production curve;
determining which power production curve minimizes a net power production loss of the blade; and
adjusting a heating cycle of the blade based on the power curve that minimizes the net power production loss of the blade.

9. The system of claim 8, wherein the heating cycle is a de-ice cycle.

10. The system of claim 8, wherein the heating cycle is an anti-ice cycle.

11. The system of claim 8, wherein the future weather conditions are updated hourly.

12. The system of claim 8, wherein the current weather conditions and future weather conditions include wind speed, liquid water content, and temperature.

13. The system of claim 8, wherein adjusting a heating cycle of the blade comprises:
minimizing a number of de-ice cycles by delaying an occurrence of a de-ice cycle.

14. The system of claim 8, wherein adjusting a heating cycle of the blade comprises:
minimizing a number of anti-ice cycles by delaying an occurrence of an anti-ice cycle.

15. A computer readable storage medium having stored thereon instructions that, when executed by a processor, cause the processor to perform an operation of controlling a temperature of a blade, the operation comprising:
inputting current weather conditions and future weather conditions into a processor;
generating a first power production curve, comprising:
generating a measured power curve based on the current weather conditions;
comparing the measured power curve to a reference power curve; and
determining when to heat the blade based on a percentage drop between the measured power curve and the reference power curve;
generating a second power production curve of the blade based on the future weather conditions;
comparing the first power production curve to the second power production curve;
determining which power production curve minimizes a net power production loss of the blade; and
adjusting a heating cycle of the blade based on the power curve that minimizes the net power production loss of the blade.

* * * * *